(12) United States Patent
Komatsu et al.

(10) Patent No.: US 12,459,490 B2
(45) Date of Patent: Nov. 4, 2025

(54) HYBRID ELECTRIC VEHICLE

(71) Applicant: TOYOTA JIDOSHA KABUSHIKI KAISHA, Toyota (JP)

(72) Inventors: Takehiro Komatsu, Toyota (JP); Akihito Hayasaka, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 221 days.

(21) Appl. No.: 18/449,218

(22) Filed: Aug. 14, 2023

(65) Prior Publication Data

US 2024/0140394 A1 May 2, 2024

(30) Foreign Application Priority Data

Nov. 2, 2022 (JP) .................................. 2022-176636

(51) Int. Cl.
*B60W 20/15* (2016.01)
*B60K 6/40* (2007.10)
(Continued)

(52) U.S. Cl.
CPC .............. *B60W 20/15* (2016.01); *B60K 6/40* (2013.01); *B60W 10/026* (2013.01); *B60W 10/06* (2013.01); *B60W 10/08* (2013.01); *F01N 3/023* (2013.01); *F02D 41/029* (2013.01); *B60K 6/387* (2013.01); *B60W 2510/0233* (2013.01); *B60W 2510/0291* (2013.01); *B60W 2510/244* (2013.01); *B60W 2510/246* (2013.01); *B60W 2710/024* (2013.01); *B60W 2710/0627* (2013.01); *B60W 2710/0666* (2013.01); *B60W 2710/083* (2013.01); *B60Y 2200/92* (2013.01); *B60Y 2400/426* (2013.01)

(58) Field of Classification Search
CPC ...................................................... B60W 20/15
See application file for complete search history.

(56) References Cited

U.S. PATENT DOCUMENTS 9,046,017 B2 * 6/2015 Nakazato ................ F01N 9/002
11,300,023 B2 * 4/2022 Kaneko ................... F01N 3/021
(Continued)

FOREIGN PATENT DOCUMENTS

JP 2021-060027 A 4/2021
JP 2021-148097 A 9/2021

*Primary Examiner* — Michael A Berns
(74) *Attorney, Agent, or Firm* — SoraIP, Inc.

(57) ABSTRACT

A hybrid electric vehicle comprising: an engine; a filter for collecting particulate matter from the engine; a motor provided on a power transmission path between the engine and the drive wheels; a torque converter having a lock-up clutch provided on the power transmission path between the motor and the drive wheels; and a control device, wherein the control device includes: a first determination unit that determines whether there is a request for regeneration control of the filter by a fuel cut in the engine; a second determination unit that determines whether the lock-up clutch cannot be engaged; and a regeneration control unit that, when an affirmative determination is made in the first determination unit and a negative determination is made in the second determination unit, executes auxiliary regeneration control that assists the rotation of the engine by the motor while releasing the lock-up clutch and executing the fuel cut.

6 Claims, 3 Drawing Sheets

(51) Int. Cl.
*B60W 10/02* (2006.01)
*B60W 10/06* (2006.01)
*B60W 10/08* (2006.01)
*F01N 3/023* (2006.01)
*F02D 41/02* (2006.01)
*B60K 6/387* (2007.10)

(56) References Cited

U.S. PATENT DOCUMENTS

| | | | |
|---|---|---|---|
| 11,524,678 B2* | 12/2022 | Ellmer | F01N 11/002 |
| 11,628,819 B2* | 4/2023 | Nose | B60L 15/20 |
| | | | 180/65.265 |
| 2021/0107448 A1* | 4/2021 | Nose | B60K 13/04 |
| 2021/0107452 A1 | 4/2021 | Nose et al. | |
| 2021/0293167 A1* | 9/2021 | Kaneko | F01N 3/021 |
| 2023/0227022 A1* | 7/2023 | Komatsu | B60W 10/06 |
| | | | 701/22 |
| 2024/0140394 A1* | 5/2024 | Komatsu | B60W 20/00 |

* cited by examiner

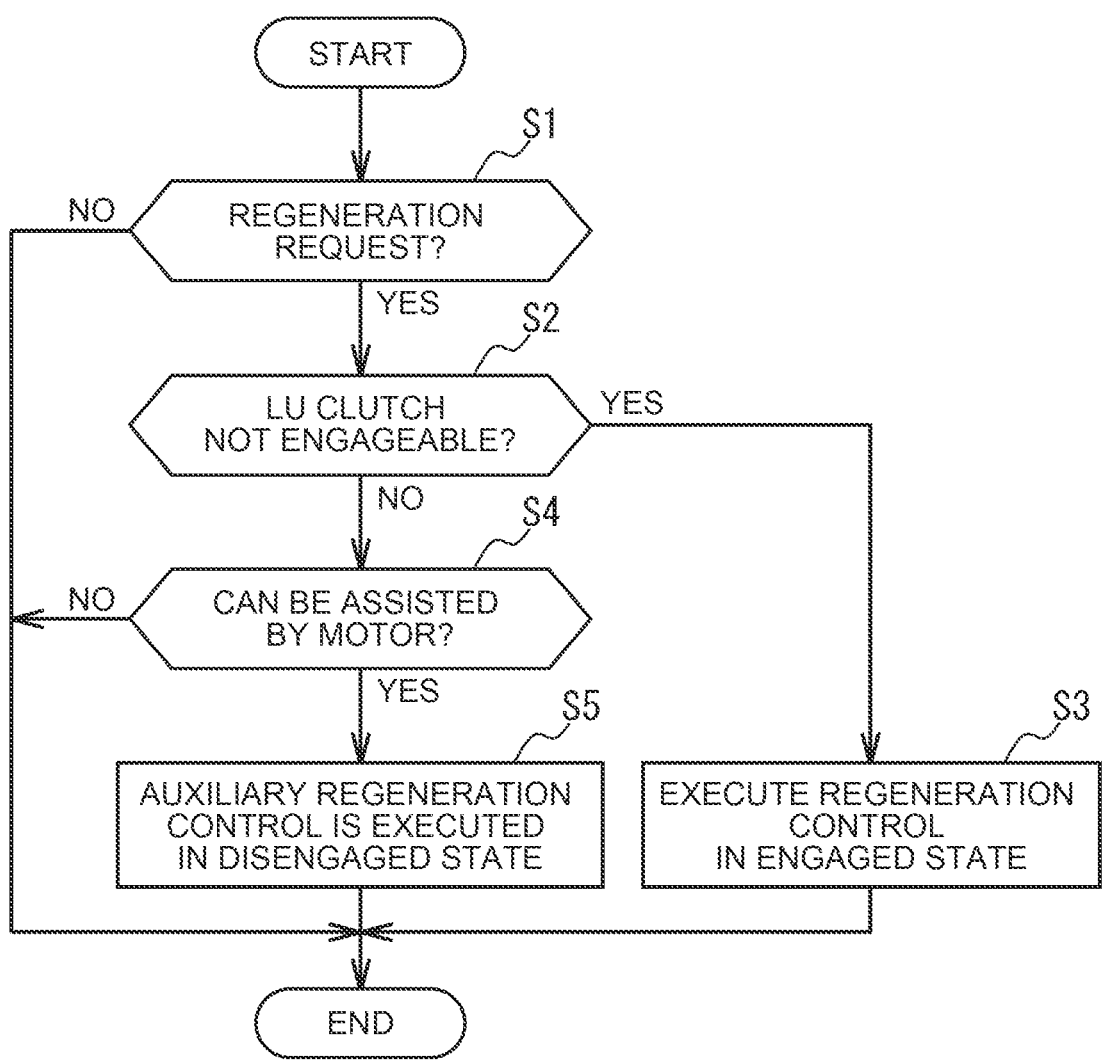

HYBRID ELECTRIC VEHICLE

CROSS-REFERENCE TO RELATED APPLICATION

This application claims priority to Japanese Patent Application No. 2022-176636 filed on Nov. 2, 2022, incorporated herein by reference in its entirety.

BACKGROUND

1. Technical Field

The present disclosure relates to hybrid electric vehicles.

2. Description of Related Art

It is known to engage a lock-up clutch in order to prevent an engine from stalling during regeneration control of a filter by a fuel cut (see, for example, Japanese Unexamined Patent Application Publication No. 2021-148097 (JP 2021-148097 A)).

SUMMARY

When a lock-up clutch is not engageable, such regeneration control cannot be executed, which may reduce the filter regeneration frequency.

It is therefore an object of the present disclosure to provide a hybrid electric vehicle in which an appropriate filter regeneration frequency is ensured.

The above object can be achieved by a hybrid electric vehicle including: an engine; a filter that collects particulate matter from the engine; a motor located on a power transmission path between the engine and a drive wheel; a torque converter located on the power transmission path between the motor and the drive wheel and including a lock-up clutch; and a control device. The control device includes a first determination unit that determines whether there is a request for regeneration control of the filter by a fuel cut in the engine, a second determination unit that determines whether the lock-up clutch is not engageable, and a regeneration control unit that, when a result of the determination of the first determination unit is yes and a result of the determination of the second determination unit is no, disengages the lock-up clutch and performs auxiliary regeneration control with the motor assisting with rotation of the engine while performing the fuel cut.

The regeneration control unit may control output torque of the motor in the auxiliary regeneration control to minimum torque that is attainable by the engine in a combustion state.

The hybrid electric vehicle may further include a battery that supplies power to the motor. The control device may further include a third determination unit that determines whether the motor is able to assist with the rotation of the engine, based on at least one of the following values of the battery: a temperature, a voltage, and a level of charge. The regeneration control unit may perform the auxiliary regeneration control when the result of the determination of the first determination unit is yes, the result of the determination of the second determination unit is no, and a result of the determination of the third determination unit is yes.

The second determination unit may determine whether the lock-up clutch is not engageable, based on a temperature of hydraulic oil supplied to the lock-up clutch.

According to the present disclosure, it is possible to provide a hybrid electric vehicle in which an appropriate filter regeneration frequency is ensured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow chart exemplifying GPF regeneration process.

DETAILED DESCRIPTION OF EMBODIMENTS

Schematic Configuration of Hybrid Electric Vehicle

Figure 1:
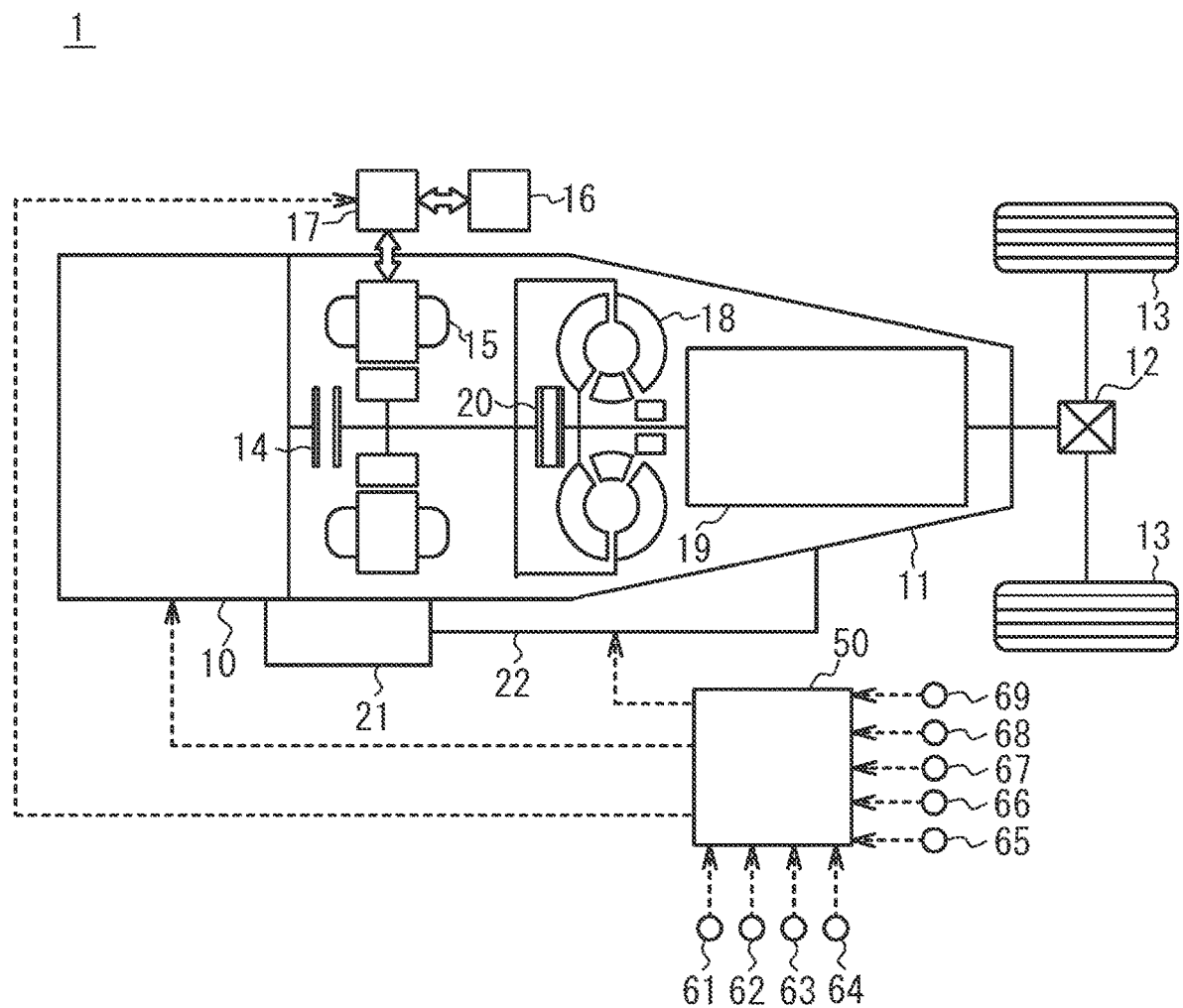
FIG. 1 is a schematic configuration diagram of a hybrid electric vehicle.

FIG. 1 is a schematic configuration diagram of a hybrid electric vehicle 1. Hybrid electric vehicle 1 is equipped with an engine 10 and a motor 15 as a driving power source. The engine 10 is a gasoline engine having a plurality of cylinders, but may be a diesel engine. A transmission unit 11 is provided on a power transmission path from the engine 10 to the drive wheels 13. The transmission unit 11 and the left and right drive wheels 13 are drivingly connected to each other via a differential 12.

The transmission unit 11 is provided with a K0 clutch 14 and a motor 15. The motor 15 is provided on a power transmission path from the engine 10 to the drive wheels 13. K0 clutch 14 is provided between the engine 10 and the motor 15 in the power transmission path. K0 clutch 14 is engaged by receiving the hydraulic pressure and connects the power transmission between the engine 10 and the motor 15. K0 clutch 14 is released in response to the stoppage of the hydraulic pressure supply and shuts off the power transmission between the engine 10 and the motor 15. In addition, K0 clutch 14 is slipped from the beginning of the torque-transmission until it is fully engaged.

The motor 15 is connected to the battery 16 via an inverter 17. The battery 16 is a rechargeable secondary battery such as a nickel-metal hydride battery or a lithium-ion battery. The motor 15 functions as a motor that generates a driving force of the vehicle in response to power supply from the battery 16. The motor 15 also functions as a generator that generates electric power to charge the battery 16 in response to power transmission from the engine 10 and the drive wheels 13. The electric power exchanged between the motor 15 and the battery 16 is adjusted by the inverter 17.

The transmission unit 11 is provided with a torque converter 18 and an automatic transmission 19. The torque converter 18 is a fluid coupling having a torque amplification function. The automatic transmission 19 is a stepped transmission in which the gear ratio is switched in multiple stages. The torque converter 18 is provided between the motor 15 and the drive wheels 13 on the power transmission path. The automatic transmission 19 is provided between the torque converter 18 and the drive wheels 13 on the power transmission path. The torque converter 18 is provided with a lock-up clutch (hereinafter referred to as a LU clutch) 20 which is engaged with the motor 15 by receiving the supply of the hydraulic pressure and directly connects the motor to the automatic transmission 19.

LU clutch 20 is engaged by receiving the hydraulic pressure and connects the power transmission between the motor 15 and the drive wheels 13. LU clutch 20 is released in response to the stoppage of the hydraulic pressure supplying. LU clutch 20 is also slipped from release to engagement.

The transmission unit 11 is further provided with an oil pump 21 and a hydraulic control mechanism 22. The hydraulic pressure generated by the oil pump 21 is supplied to K0 clutch 14, the torque converter 18, the automated transmission 19, and LU clutch 20 via the hydraulic pressure control unit 22. The hydraulic control unit 22 is provided with hydraulic circuits of K0 clutch 14, the torque converter 18, the automated transmission 19, and LU clutch 20, and various hydraulic control valves for controlling the hydraulic pressures.

Hybrid electric vehicle 1 is provided with an electronic control unit (ECU) 50 as a control device for hybrid electric vehicle. ECU 50 is an electronic control unit including an arithmetic processing unit that performs various arithmetic processing related to travel control of vehicles, and a memory that stores control programs and data. ECU 50 is an exemplary control device, and functionally implements a first determination unit, a second determination unit, a third determination unit, and a regeneration control unit that will be described in detail later.

ECU 50 is connected with an ignition switch 61, a crank angle sensor 62, an air flow meter 63, air-fuel ratio sensors 64 and 65, a water temperature sensor 66, a State Of Charge (SOC) sensor 67, a battery temperature sensor 68, and a battery voltage sensor 69. The ignition switch 61 detects ON/OFF of the ignition. The crank angle sensor 62 detects the rotational speed of the crankshaft of the engine 10. The air flow meter 63 detects an amount of intake air introduced into the engine 10. The air-fuel ratio sensors 64 and 65 detect the air-fuel ratio of the exhaust gas of the engine 10. The water temperature sensor 66 detects the temperature of a coolant for cooling the engine 10. SOC sensor 67 detects the level of charge of the battery 16. The battery temperature sensor 68 detects the temperature of the battery 16. The battery voltage sensor 69 detects the voltage of the battery 16.

ECU 50 controls driving of the engine 10 and the motor 15. Specifically, ECU 50 controls the inverter 17 to control the torque of the motor 15 by adjusting the amount of transfer of electric power between the motor 15 and the battery 16. ECU 50 controls driving of K0 clutch 14, LU clutch 20, and the automated transmission 19 through control of the hydraulic control unit 22.

ECU 50 causes hybrid electric vehicle 1 to travel in either the motor running mode or the hybrid running mode. In the motor running mode, ECU 50 releases K0 clutch 14 to rotate the drive wheels 13 with the power of the motor 15. In the hybrid drive mode, ECU 50 engages K0 clutch 14 to rotate the drive wheels 13 with the power of at least one of the engine 10 and the motor 15. For example, when the required driving force for hybrid electric vehicle 1 is equal to or higher than the driving force threshold, the driving force is switched from the motor driving mode to the hybrid driving mode. Further, when the level of charge of the battery 16 becomes equal to or less than the electric power threshold value, the mode is switched from the motor running mode to the hybrid running mode.

Schematic Configuration of the Engine

Figure 2:
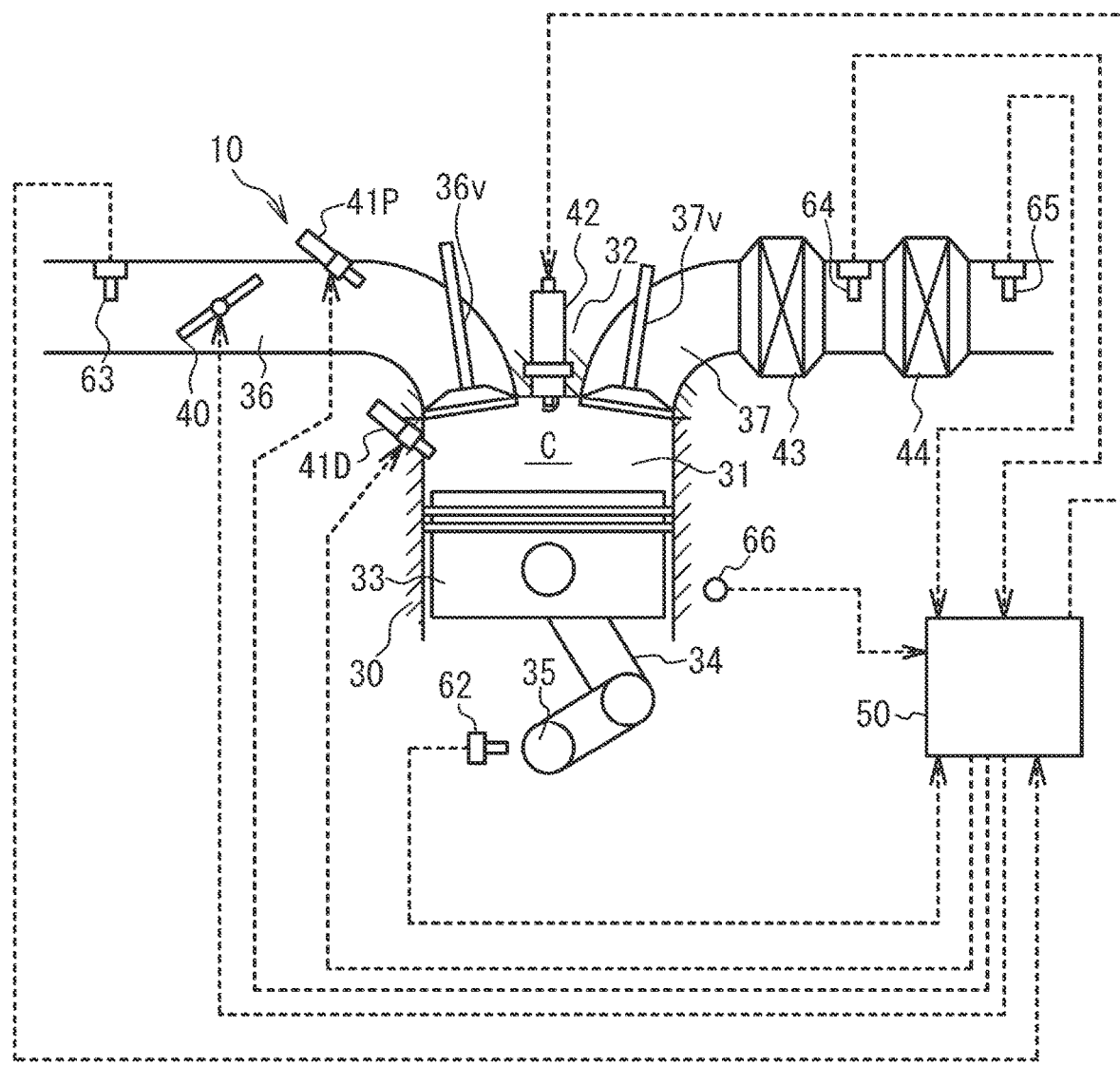
FIG. 2 is a schematic block diagram of an engine.

FIG. 2 is a schematic configuration diagram of the engine 10. The engine 10 includes a cylinder block 30, a cylinder head 32, a piston 33, a connecting rod 34, a crankshaft 35, an intake passage 36, an intake valve 36*v*, an exhaust passage 37, and an exhaust valve 37*v*.

The cylinder block 30 is provided with a cylindrical bore 31. The piston 33 is reciprocally accommodated in the bore 31. The wall surface of the bore 31, the lower surface of the cylinder head 32, and the top surface of the piston 33 define the combustion chamber C. The volume of the combustion chamber C increases or decreases due to the reciprocation of the piston 33.

The crankshaft 35, which is an output shaft of the engine 10, is connected via a connecting rod 34. The connecting rod 34 and the crankshaft 35 convert the reciprocating motion of the piston 33 into the rotational motion of the crankshaft 35. The engine 10 is provided with the above-described crank angle sensor 62.

The intake passage 36 is connected to the combustion chamber C via an intake valve 36*v*. The exhaust passage 37 is connected to the combustion chamber C via an exhaust valve 37*v*. The air flow meter 63 described above is provided in the intake passage 36.

The cylinder block 30 is provided with an in-cylinder injection valve 41D for directly injecting fuel into the combustion chamber C. The intake passage 36 is provided with a port injection valve 41P for injecting fuel toward the intake port. The cylinder head 32 is provided with an ignition plug 42 for igniting the air-fuel mixture of intake air and fuel introduced into the combustion chamber C. Note that only one of the in-cylinder injection valve 41D and the port-injection valve 41P may be provided.

A three-way catalytic converter 43 and a gasoline particulate filter (GPF) 44 are provided in the exhaust passage 37. The three-way catalyst 43 contains a catalyst metal, has an oxygen-absorbing ability, and purifies NOx, HC and CO. GPF 44 is a porous ceramic structure, and collects exhaust fine particles (hereinafter referred to as particulate matter (PM)) in exhaust gases. GPF 44 is an exemplary filter. For example, when the engine 10 is a diesel engine, a diesel particulate filter (DPF) is provided instead of GPF 44.

An air-fuel ratio sensor 64 is provided between the three-way catalytic converter 43 and GPF 44. The air-fuel ratio sensor 64 detects the air-fuel ratio of the exhaust gas discharged from the three-way catalyst 43. An air-fuel ratio sensor 65 is provided downstream of GPF 44. The air-fuel ratio sensor 65 detects the air-fuel ratio of the exhaust gas discharged from GPF 44.

In ECU 50, the driving of the engine 10 is controlled by controlling the opening degree of the throttle valve 40, the fuel-injection quantity of the in-cylinder injection valve 41D and the port-injection valve 41P, the ignition timing of the ignition plug 42, and the like, based on the sensor-detected signal.

ECU 50 estimates GPF 44 deposition amount of PM, and requests regeneration control of GPF 44 when PM deposition amount becomes equal to or greater than a predetermined value. The method of estimating PM deposit may be estimated based on, for example, the driving history of the engine 10 from the completion of the previous regeneration control, the differential pressure before and after GPF 44, or the like, or may be estimated by any other known method. In the regeneration control, oxygen is supplied to GPF 44 to burn the deposited PM by performing fuel-cutting.

GPF Recycling Process

FIG. 3 is a flow chart illustrating GPF regeneration process. This process is repeatedly executed while the ignition is on. ECU 50 determines whether or not there is a reproduction request (S1). If S1 is No, this control is terminated. S1 is an exemplary process executed by the first determination unit.

If S1 is Yes, ECU 50 determines whether or not LU clutch 20 cannot be engaged (S2). Specifically, ECU 50 determines that LU clutch 20 cannot be engaged when the temperature of the hydraulic fluid is less than a predetermined value. The predetermined value is set to a minimum temperature that does not interfere with the engagement of LU clutch 20. This is because, when the temperature of the hydraulic oil is less than the predetermined value, the viscosity of the hydraulic oil becomes too high, and the responsiveness and controllability of LU clutch 20 deteriorate. S2 is an exemplary process executed by the second determination unit.

If S2 is Yes, ECU 50 puts LU clutch 20 into engagement and performs fuel-cut regeneration control (S3). When LU clutch 20 is engaged, the power is transmitted from the drive wheels 13 to the engine 10 even during the fuel-cutting operation, and a decrease in the rotational speed of the engine 10 is suppressed. As a result, GPF 44 can be reproduced while the engine 10 is prevented from stalling.

If S2 is No, ECU 50 determines whether the motor 15 can assist in rotating the engine 10 (S4). Specifically, when the fuel-cutting is executed while LU clutch 20 is released, it is determined whether or not the motor 15 can assist the engine 10 to rotate so that the engine 10 does not stall.

For example, in a case where the temperature of the battery 16 is less than the predetermined value, a case where the voltage of the battery 16 is less than the predetermined value, and a case where the level of charge of the battery 16 is less than the predetermined value, S4 is determined to be No. If S4 is No, this control ends. This is because, when the temperature of the battery 16 is less than the predetermined value or when the level of charge of the battery 16 is less than the predetermined value, there is a possibility that the electric power supplied from the battery 16 to the motor 15 is lowered. Further, when the motor 15 tries to assist the rotation of the engine 10 when the voltage of the battery 16 is less than the predetermined value, there is a possibility that the deterioration of the battery 16 progresses. S4 is an exemplary process executed by the third determination unit.

When S4 is Yes, ECU 50 executes auxiliary regeneration control, which is regeneration control by fuel-cutting, while assisting the motor 15 in rotating the engine 10 while LU clutch 20 is released (S5). As a result, it is possible to prevent the engine 10 from stalling while suppressing a decrease in the rotation of the engine 10, thereby ensuring a fuel cut time. Since GPF 44 can be reproduced even when LU clutches 20 cannot be engaged as described above, a decrease in the reproduction frequency can be suppressed. S5 is an exemplary process executed by the regeneration control unit.

In the auxiliary regeneration control, ECU 50 controls the output torque of the motor 15 to the smallest torque that can be output by the engine 10 in a burned condition. The minimum torque that can be output by the engine 10 in the combustion state is the minimum value of the torque shown in the drawing within a range in which misfire does not occur. Therefore, the total torque output from the engine 10 and the motor 15 during the execution of the auxiliary regeneration control is a torque obtained by subtracting the friction torque of the engine 10 and the auxiliary torque from the minimum torque. In other words, during the execution of the auxiliary regeneration control by the fuel-cut operation, the motor 15 simulates a state in which LU clutch 20 is in a released state and the engine 10 is operating at a minimal torque. Therefore, for example, when the auxiliary regeneration control is executed in the hybrid driving mode, it is possible to prevent the driver from noticing that the driving power source has been switched from the engine 10 to the motor 15. The minimum torque of the engine 10 is stored in ROM of ECU 50 in advance on the basis of an experiment/simulation result.

Although the embodiments of the present disclosure have been described in detail above, the present disclosure is not limited to such specific embodiments, and various modifications and changes can be made within the scope of the gist of the present disclosure described in the claims.

The invention claimed is:

1. A hybrid electric vehicle, comprising:
an engine;
a filter that collects particulate matter from the engine;
a motor located on a power transmission path between the engine and a drive wheel;
a torque converter located on the power transmission path between the motor and the drive wheel and including a lock-up clutch;
a battery that supplies power to the motor; and
a control device,
the control device configured to:
determine whether there is a request for regeneration control of the filter by a fuel cut in the engine,
determine whether the lock-up clutch is not engageable,
determine whether the motor is able to assist with the rotation of the engine, based on at least one of the following values of the battery: a temperature, a voltage, and a level of charge, and
in a case where the control device determines that there is the request for regeneration control, the lock-up clutch is not engageable, and the motor is able to assist with the rotation of the engine, disengage the lock-up clutch and perform auxiliary regeneration control with the motor assisting with rotation of the engine while performing the fuel cut.

2. The hybrid electric vehicle according to claim 1, wherein the control device controls output torque of the motor in the auxiliary regeneration control to minimum torque that is attainable by the engine in a combustion state.

3. The hybrid electric vehicle according to claim 2, wherein further comprises a memory storing the minimum torque of the engine.

4. The hybrid electric vehicle according to claim 1, wherein the control device determines whether the lock-up clutch is not engageable, based on a temperature of hydraulic oil supplied to the lock-up clutch.

5. The hybrid electric vehicle according to claim 1, wherein
the control device further configured to:
in a case where the control device determines that there is the request for regeneration control, and the lock-up clutch is engageable, engage the lock-up clutch and perform fuel-cut regeneration control without the motor assisting with rotation of the engine while performing the fuel cut.

6. The hybrid electric vehicle according to claim 1, wherein
the control device connects with an ignition switch, a crank angle sensor, an air flow meter, air-fuel ratio sensors, a water temperature sensor, a State Of Charge sensor, a battery temperature sensor, and a battery voltage sensor.

* * * * *